Patented Sept. 12, 1944

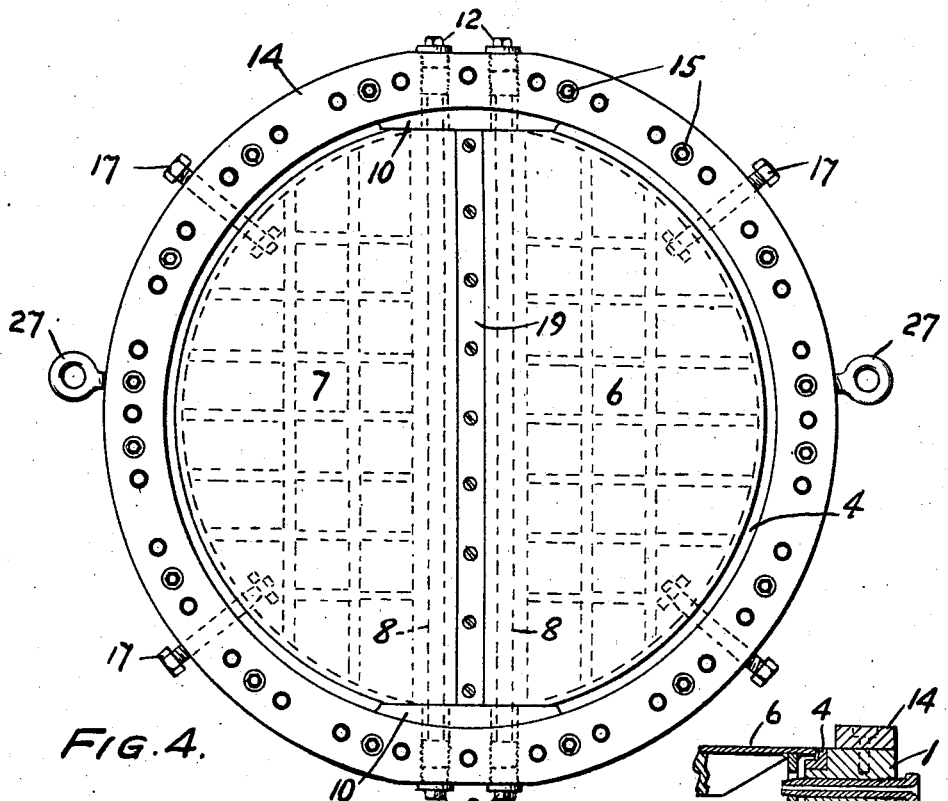

2,358,101

UNITED STATES PATENT OFFICE 2,358,101

RELIEF VALVE

Merwyn C. Randall, Philadelphia, Pa.

Application March 23, 1943, Serial No. 480,139

3 Claims. (Cl. 137—53)

The present invention relates to relief valves adapted to relieve a pressure vessel or steam turbine or other apparatus from pressure in excess of that for which it was designed.

Objects of the present invention are to provide a relief valve costing much less than conventional relief valves of comparable quality and reliability; to provide a relief valve free from any appurtenances which through carelessness on the part of the operator might cause it to fail to function thus affording maximum operating reliability; to provide a relief valve construction which precludes failure under the most adverse operating conditions; to provide a relief valve that may be used successfully in both high and low pressure operations and for any temperature condition within commonly accepted steam or gas practice; to provide a relief valve which when opened remains in that position until manually closed and serviced; to provide a relief valve which requires no maintenance once it is installed in operating position; to provide a relief valve in which the relieving area can be definitely established for any quantity of steam, gas or other fluid; to provide a relief valve which will relieve the total steam flow to a turbine in case of failure of the condenser circulating water; to provide a relief valve which will insure a positive mechanical seal against air infiltration such as would destroy a condenser vacuum; to provide a condenser valve which will insure quick relief under relatively small reversal of pressure; to provide a relief valve which will insure free unobstructed flow in one direction by positively removing a sealing sheet or diaphragm in such a way that a predetermined cross sectional area in the relief opening in which it is installed is insured, and, generally to provide a comparatively inexpensive, reliable and efficient relief valve.

Other objects of the invention will appear from the following description at the end of which the invention will be claimed.

Generally stated, the invention consists of a ring provided at the inner edge with a rabbet or groove constituting a gate seat and defining a face; a pair of semi-circular gates diametrically pivoted in the ring and normally closed in respect to said seat but free to open under differential pressure on its opposite faces; and a thin diaphragm covering the face of the gates and the face of the ring and sealing the joint between the two, said diaphragm constructed and arranged to be sheared when the gates are opened.

The invention also comprises the improvements to be presently described and finally claimed.

In the following description reference will be made to the accompanying drawings forming part hereof and in which, Figure 1 is an elevational view partly in section of a relief valve embodying features of the present invention showing the same in application as an atmospheric relief valve for a steam turbine installation.

Figure 4 is a view looking from right to left in Figure 1 and showing a face view of the ring with parts omitted.

Figure 5 is a top view of a bearing block shown at the top and bottom of Figure 4 and drawn to an enlarged scale.

Figure 6 is a sectional view of Figure 5; and

Figure 7 is a sectional view taken generally through a lock pin 17 in Figure 4.

Figure 1:
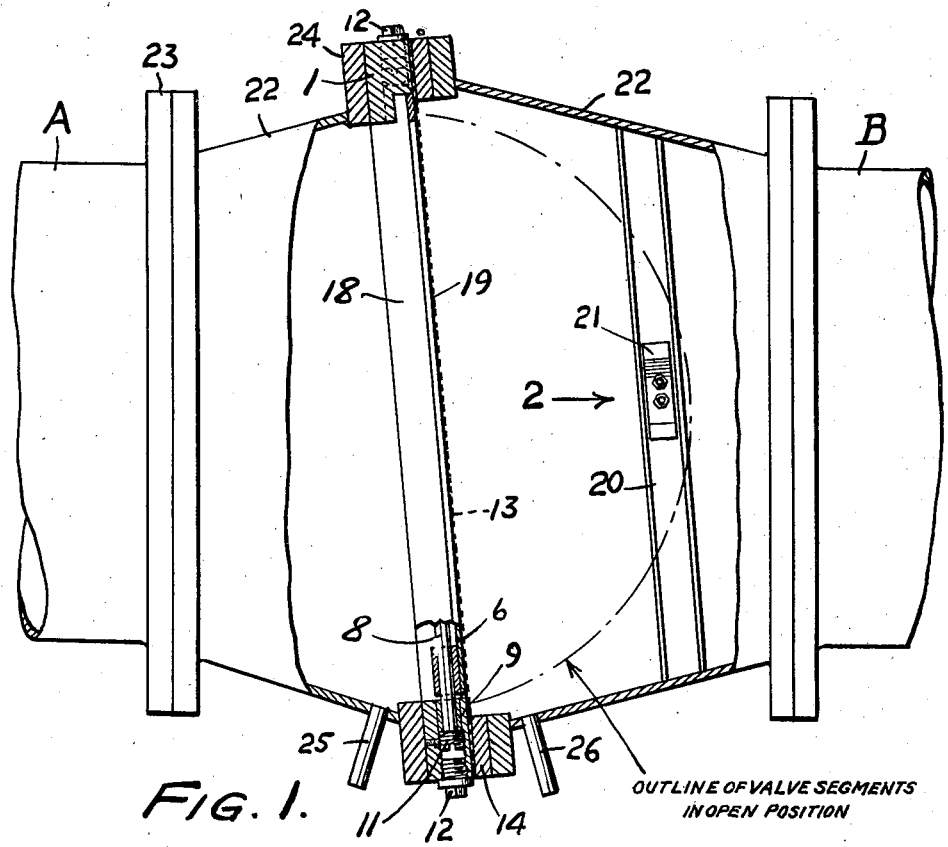
Figure 2:
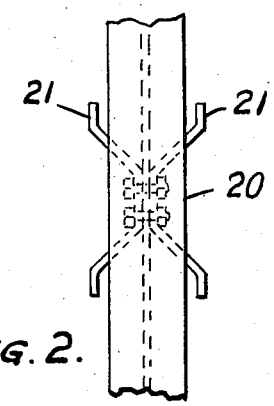
Figure 2 is an end view of the bumper element shown in Figure 1 drawn to an enlarged scale.
Figure 3:
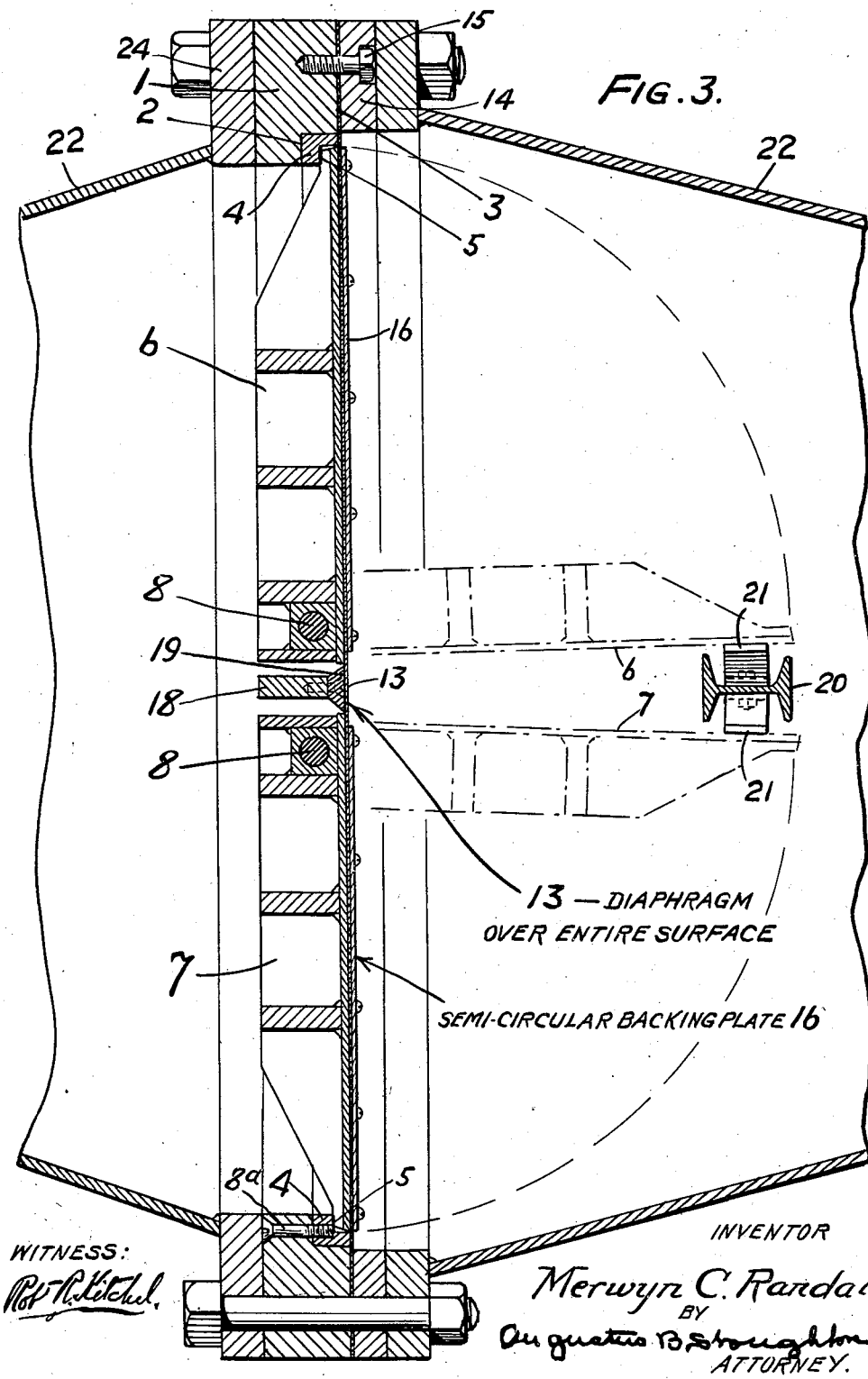
Figure 3 is a top or plan view of the middle portion of the apparatus shown in Figure 1 drawn to an enlarged scale.

In the drawings, 1 is a ring provided at its inner edge with a rabbet or groove 2 and also with a face 3. In the rabbet or groove 2 is mounted a ring 4 rabbetted on its inner edge and defining a seat 5. 6 and 7 indicate a pair of semi-circular gates diametrically pivoted in the ring 1 and in closed position seated in seat 5. The ring 4 is secured in the groove or rabbet 2 by means of screws or lag bolts 8ª. The gates as shown are reinforced by ribs indicated in dotted lines in Figure 4. The gates are respectively provided with pivots 8 shown as disposed vertically. The pivots are journaled at the top and bottom of the ring 1. The pivots are journaled in sleeves 9, Figure 6, and these sleeves are mounted between the ring 4 and the ring 1. For this purpose blocks 10 in the form on one edge of a circle and on the other edge of a flat surface are employed. The ends of the pivots rest on the spherical surface of elements 11, Figure 1. 12 are plugs for closing the openings into which the screw elements 11 are inserted.

13 indicates a thin sheet or diaphragm of metal shown in the form of a disk and it overlies the face 3 of the ring 1, the face 5 of the ring 4, and the face of the gates. One or both of the faces of this disk or diaphragm may be suitably painted or coated if desired. The ring 14, which may be designated a bezel ring, serves to clamp the marginal portion of the diaphragm 13 between itself and the face 3 of the ring 1. The ring 14 is held to place by the screws 15. 16 are semi-circular cover or backing plates which when present secure the diaphragm 13 to the faces of the gates and oppose any tendency which the diaphragm 13 may have to sag. In assembling or transporting the device use is made of locking or stop pins 17, Figure 7, for holding the gates against undesirable movements of opening or closing. These locking pins are shown as tubular for a purpose that will be described. When the device is in operative position these stop pins 17 are removed and replaced by plugs similar to plugs 12 which do not engage the gates. Between the confronting edges of the gates there is a center bar 18 over the face 19 of which the diaphragm 13 extends. There is a buffer for the gates when they open and it is shown to comprise an angle iron 20 disposed generally parallel to the center bar 18 and provided with spring stops 21.

As illustrative of one manner of use of the described relief valve reference is made to Figure 1 in which the relief valve is interposed in the blow-off or vent pipe A—B of a steam turbine and the pipe A is normally under minus pressure or is connected with the condenser and the pipe B leads to the atmosphere. 22 are pipes of the form of conic segments or conic frustums between the larger end of which the ring 1 is interposed causing the effective flow area to be maintained substantially constant. There are flanges 23 between the pipe A and the pipe 22 and there is a flange 24 on the pipe element 22 by which it is bolted to the ring 1. 25 is a drain suitably connected to vacuum and 26 is a drain connected to the atmosphere.

In describing the mode of operation of the relief valve in connection with its application to a turbine the intention is not to limit the invention to that particular application, because from the description it will be evident to those skilled in the art that the described relief valve is applicable to many other uses. Assuming that the parts are in the position shown in full lines in the drawings it is evident that the diaphragm 13 seals the sub-atmospheric pressure of the pipe A in respect to the atmospheric pressure of the pipe B. Obviously the diaphragm 13 prevents infiltration of air from pipe B to pipe A, and it forms normally a perfect seal between pipes A and B. If the pressure in the pipe A rises slightly above the pressure in the pipe B, for example by reason of the failure of the water supply in the condenser of the turbine, the result might be to cause serious trouble at the tail of the turbine but that does not happen; on the contrary, the gates open as indicated by dotted lines in Figure 1 toward the buffer 20 and in doing so shear or rupture the marginal portion of the diaphragm 13, thus breaking it and permitting free and unobstructed vent from pipe A to pipe B and thence to the atmosphere. The ring 1 is set at an inclination to the vertical in its mounting and the purpose of this is to eliminate any possibility of the gates exerting a stress upon the diaphragm, and to keep the gates seated during periods when the pressure is equalized on both sides of the gates. The valve is then serviced. For this purpose it is dismounted and since it is structurally very heavy it is shown as provided with eyes 27, Figure 4. The ruptured diaphragm or thin sheet of metal, as lead 13, is replaced by a new sheet and the valve is returned to its original mounting. During the removal and remounting use is made of the pins 17 which serve to prevent the gates from flapping. After the serviced valve has been restored to its mounting these pins 17 should be removed and replaced by solid plugs which do not engage the gates. To insure that this be done the pins 17 are made tubular and if they are accidentally permitted to remain in place no substantial vacuum can be established in the pipe A and this gives notice that the tubular pins should be removed and replaced by plugs. Of course in applying a diaphragm 13 in the manner indicated it is necessary to remove the bolts and lag screws by which the various parts are held in place as shown in the drawings and to thereafter replace them.

It will be obvious to those skilled in the art to which the invention relates that modifications may be made in details of construction and arrangement and in matters of mere form without departing from the spirit of the invention.

I claim:

1. A relief valve comprising the combination of, a ring provided at the inner edge with a rabbet or groove constituting a gate seat and defining a face, a pair of semi-circular gates diametrically pivoted in the ring and normally closed in respect to the seat, a thin metallic sheet covering the face of the gates and the face of the ring and sealing the joint between the two, and means for pivotally supporting said gates comprising pivots, sleeves for the pivots, a block of the general form of a truncated segment of a circle between which and the ring the sleeves are mounted, and screw elements having generally spherical ends confronting the ends of the pivots, said sheet constructed and arranged to be ruptured when the gates are opened.

2. In apparatus of the type described, the combination of, a ring having pipe connections constructed for interposition between sections of a blow-off pipe at a point to one side of which pressure is relatively high and to the other side of which pressure is normally relatively low, a pair of gates pivotally mounted in the ring and each of the form of a half-disk commensurate in area with the inside area of the ring and normally held shut by the relatively high pressure, oppositely disposed pivots interposed between the inside of the ring and the confronting edges of the gates and allowing the gates to swing when the relatively low pressure becomes higher than the relatively high pressure toward the central axis of the ring into open position, a sheet-metal disk overlying the high pressure face of the ring and the high pressure faces of the gates when in closed position, a second ring overlying the rim of the sheet-metal disk, semi-circular backing-up plates overlying the sheet-metal disk and secured to the gates, an annular portion of the sheet-metal disk being exposed between the second ring and the backing-up plates and in position to be sheared by the curved edge portions of the gates when opened, the first-mentioned ring being at an inclination to the vertical to balance the weight of the gates, and said pipe connections having the form of conic segments or frustums between the larger ends of which the ring is interposed and the other ends of which are constructed to be connected to the blow off pipe sections.

3. A relief valve comprising, in combination, a ring provided at its inner edge with a rabbet defining a face, a second ring internally and diametrically defining flattened portions and detachably mounted in said rabbet and provided at its inner edge with a groove constituting a gate seat and defining a face, a pair of diametrically pivoted semi-circular gates having flattened polar portions and normally closed in respect to said seat, a thin diaphragm covering the face of the gates and the faces of the first and second rings and sealing the joint between said parts, pivot pins projecting from the gates, bearing blocks of the form of truncated circular segments detachably connected with the flattened portions of the second ring, and bearings for said pins provided between the blocks and the flattened portion of the second ring.

MERWYN C. RANDALL.